United States Patent [19]

Syszczyk et al.

[11] Patent Number: 4,782,620

[45] Date of Patent: Nov. 8, 1988

[54] RODENT TRAP

[76] Inventors: Antonio M. Syszczyk, 14170 SW. 93 La., Miami, Fla. 33186; Basilio M. Jarosiewicz, 2814 SW. 67th Way, Miramar, Fla. 33023

[21] Appl. No.: 58,568

[22] Filed: Jun. 5, 1987

[51] Int. Cl.⁴ ............................................. A01M 23/18
[52] U.S. Cl. ............................................. 43/61; 43/66
[58] Field of Search ........................................ 43/61, 66

[56] References Cited

U.S. PATENT DOCUMENTS

| | | |
|---|---|---|
| 111,771 | 2/1871 | Oliver ..................................... 43/61 |
| 4,080,749 | 3/1978 | Gilbaugh ................................ 43/61 |
| 4,142,320 | 3/1979 | Marcolina et al. ..................... 43/61 |
| 4,158,929 | 6/1979 | Custard . |
| 4,173,092 | 11/1979 | Nakai ..................................... 43/61 |
| 4,452,004 | 6/1984 | Matsuura ............................... 43/61 |
| 4,483,093 | 11/1984 | Isborn . |
| 4,569,149 | 2/1986 | Sensing et al. . |
| 4,578,892 | 4/1986 | Melton . |
| 4,578,893 | 4/1986 | Wikenberg . |

FOREIGN PATENT DOCUMENTS 128183 7/1948 Australia ............................. 43/61

Primary Examiner—Nicholas P. Godici
Assistant Examiner—Carmine Cuda
Attorney, Agent, or Firm—Jerry A. Miller

[57] ABSTRACT

An apparatus for capturing rodents, includes an enclosure having an entrance at an end thereof for allowing entry of a rodent. A door for closing the opening is hinged at an upper portion of the enclosure, for allowing the door to swing from its upper edge. A ramp is coupled to the inner wall of the enclosure, for allowing the door to open freely from a set position when urged inward by the rodent, and for causing the door to move to a latched position when urged outward by the rodent or by the force of swinging to a closed position after having been opened by the rodent.

19 Claims, 1 Drawing Sheet

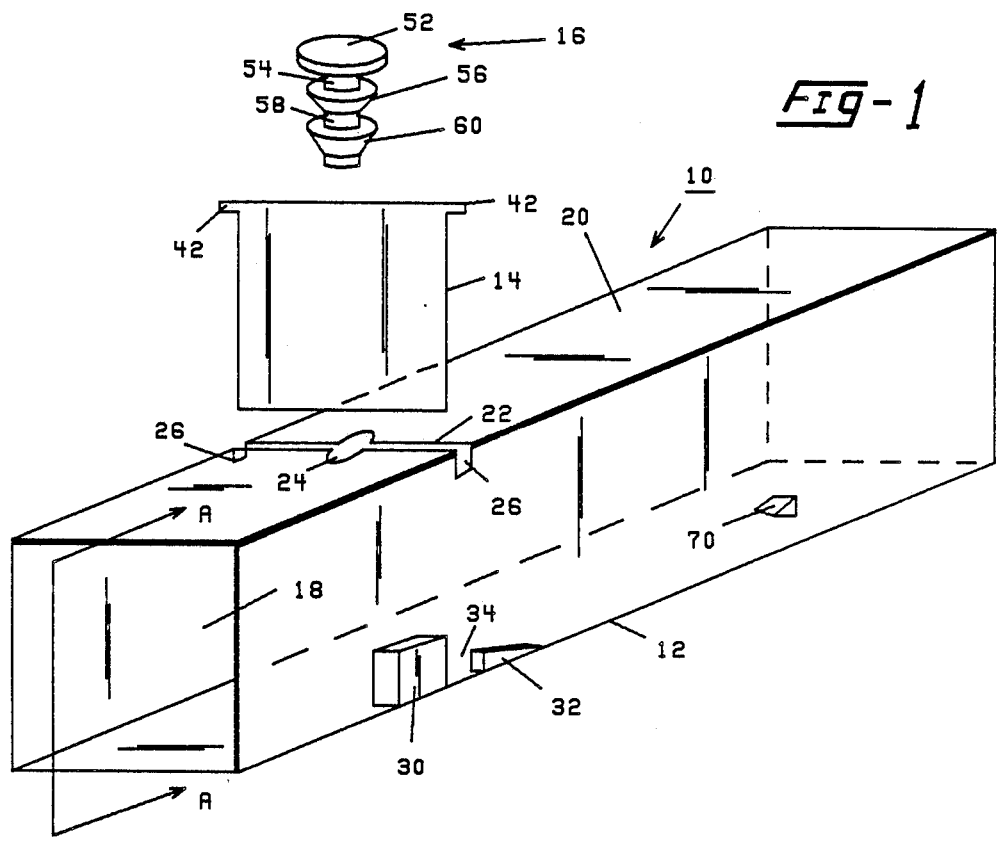
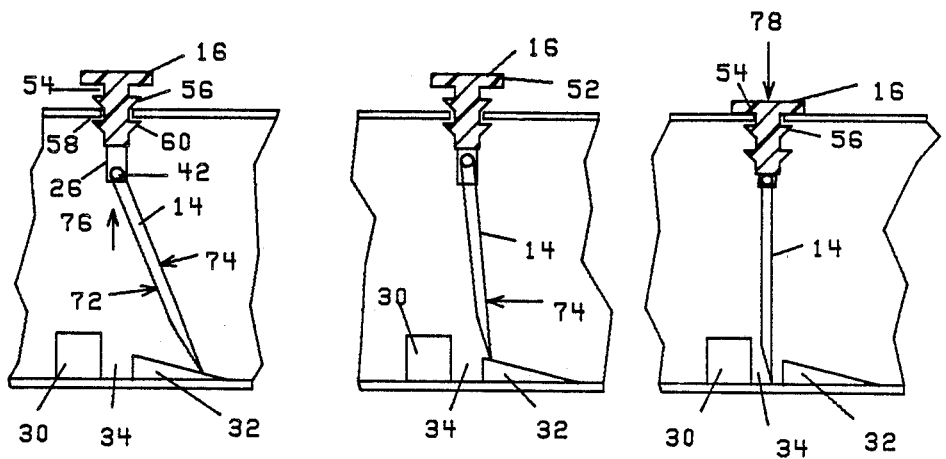

RODENT TRAP

BACKGROUND OF THE INVENTION

1. FIELD OF THE INVENTION

This invention relates generally to traps designed to trap mice, rats and other rodents and the like. More particularly, this invention relates to an improved disposable rodent trap which is extremely simple in design, safe to use and inexpensive to manufacture.

2. BACKGROUND

Rodents such as mice and rats have long been known to be carriers of disease, and are generally considered to be an undesirable pest. Numerous designs for improved rodent traps have been proposed over the years for the purpose of ridding the home, food store, restaurant, office or other places of these pests. Numerous approaches have been taken to the problem from poison baits, to glue traps which stick to and capture the rodent, to conventional and not so conventional spring-type traps, to traps designed to apprehend and contain the rodent. The present invention is of the containment type.

One such containment type trap is shown in U.S. Pat. No. 4,578,892 to Melton which utilizes a container with two bottom surfaces at an obtuse angle and a swinging door. When the rodent enters the trap in an attempt to reach a piece of bait, the trap tips from the first to the second bottom surface causing the door to swing closed.

Other containment type traps have also been proposed in various configurations, for example U.S. Pat. Nos. 4,158,929 and 4,569,149 and 4,483,093 and 4,578,893. The present invention is believed to be safer than these devices and simpler in design and operation.

The present invention also provides other advantages and features which are not contemplated by the prior art as will be appreciated after consideration of the following description taken in conjunction with the accompanying drawings.

SUMMARY OF THE INVENTION

Accordingly, it is an object of the present invention to provide an improved rodent trap.

It is another object of the present invention to provide an improved disposable containment type rodent trap.

It is another object of the present invention to provide a rodent trap which is simple and inexpensive in design.

It is another object of the present invention to provide a rodent trap which may be easily adapted to capture rodents of varying sizes.

It is a further object and advantage of the present invention to provide an improved rodent trap which is safe to use in almost any environment.

It is an advantage of the present invention that the trap uses few parts and is simple and inexpensive to manufacture.

It is another advantage of the present invention that the trap uses no glues, poisons or spring mechanisms which can be hazardous, messy or unsafe.

In one embodiment of the present invention an apparatus for capturing rodents includes an enclosure having an entrance at an end thereof for allowing entry of a rodent. A door for closing the entrance is hinged at an upper portion of the enclosure, for allowing the door to swing from its upper edge. A ramp is coupled to the inner wall of the enclosure, for allowing the door to open freely from a set position when urged inward by the rodent, and for causing the door to move to a latched position when urged outward by the rodent or by the force of swinging to a closed position after having been opened by the rodent.

In the preferred embodiment of the present invention the enclosure is made of a clear plastic to simplify determination of the capture of a rodent. A lock button is provided at the top of the enclosure to securely lock the door in the closed position once the rodent is captured.

These and other objects, features, and advantages of the invention will become apparent to those skilled in the art upon consideration of the following detailed description taken in conjunction with the accompanying drawings.

BRIEF DESCRIPTION OF THE DRAWINGS

FIG. 1 is an exploded view of the rodent trap of the present invention.

FIG. 2 is a cutaway view of a portion of the rodent trap of the present invention taken along lines A—A of FIG. 1 with the trap in the set position.

FIG. 3 is a view similar to FIG. 2 showing the action of the door of the trap when closing.

FIG. 4 is a view similar to FIGS. 2 and 3 showing the door in the closed position.

DETAILED DESCRIPTION OF THE INVENTION

Turning now to the drawings wherein like reference numerals designate identical or corresponding parts throughout the several views, and more particularly to FIG. 1 thereof, there is shown an exploded view of the trap 10 of the present invention. The trap 10 includes three main parts: an enclosure 12, a door 14 and a door lock button 16. In the preferred embodiment, the enclosure is a rectangular box. For a version suitable for a mouse, the enclosure may be approximately seven (7) inches in length by approximately one and one half (1 1/2) inches square. Of course these dimensions may be suitably modified to provide for the capture of larger rodents.

The enclosure 12 has an open end or entrance 18 which serves as an entrance for the mouse, but is otherwise substantially fully enclosed. The enclosure 12 also has a top 20 which includes a channel 22 running across the short dimension thereof close to the entrance thereof. In the mouse size version, the channel 22 is approximately one (1) inch from the entrance 18. The channel 22 includes a circular opening 24 in a central portion thereof. The channel 22 extends down each side of the enclosure to form a slot 26 on each side of the trap's enclosure. In the present embodiment of the trap 10 the slot is shown as rectangular, but this is not to be limiting as other shapes may provide certain adantages.

Directly below the slot 26 adjacent and attached to one side of the enclosure is an approximately square block 30 and an approximately triangular ramp 32. The ramp 32 is approximately one eighth (1/8) inch in height and the block 30 is somewhat taller. The block 30 and the ramp 32 are separated by a space 34 which is adequately wide to comfortably allow the door 14 to slide therein.

The door 14 is also substantially rectangular in the present embodiment and includes a pair of tabs 42 extending from the sides at the top in the same plane as the door itself. The tabs 42 are rounded on the bottom in a preferred embodiment, and may be circular as shown in the later FIGURES. These tabs 42 rest in slots 26 when the door is inserted into the channel 22. This arrangement secures the top of the door in the proper location at the upper portion of the trap and allows the door to swing open with the tabs 42 working within the slot 26 to form a hinging mechanism.

The lock button 16 is made of a resilient material and is designed to snap into position through the circular opening 24 in one of two positions as will be discussed later. The lock button 16 is made of a resilient material such as nylon, rubber or flexible plastic such as PVC in the preferred embodiment. The lock button 16 includes an upper button portion 52 which is substantially larger than the circular opening 24. Below the button portion is a narrower region 54 which is small enough to pass through the circular opening 24. Below this narrow portion is a tapered portion 56 which goes from narrow to wide and allows the user to force this tapered through the circular aperture. Below this tapered portion 56 is a second narrower region 58 similar to 54. Below narrower region 58 is a second tapered portion 60 similar to tapered portion 56.

In the preferred embodiment, the enclosure 12 and door 14 are made of thin plastic which is relatively rigid and preferably transparent or translucent. Materials such as acrylic or other types of plastic are suitable. The channel and slots should be smooth to facilitate proper operation. The block 30 and ramp 32 are preferably molded into one of the side walls of the enclosure 12 and extend inward from the side wall enough the captivate the door 14 within the space 34 securely. In the mouse size version, the ramp 32 may be approximately one eighth (⅛) inch in height and suitably long at the hypotenuse to allow the door to readily slide along the ramp with little resistance.

Turning now to FIG. 2, viewed in conjunction with FIGS. 1, 3 and 4, the operation of the present trap will be explained. FIG. 2 shows the trap in the set position awaiting entry of a rodent. The trap is baited by placing a small piece of cheese or other bait 70 in the enclosure near the closed end. The enclosure may be provided with small holes if desired to allow air circulation past the bait 70 to attract the unsuspecting rodent by smell. In the set position of FIG. 2, the tabs 42 rest within the slot 26 and the door is captivated in place by lock button 16 which is inserted into the circular opening 24 beyond tapered portion 60 so that the circular opening 24 captivates the lock button 16 at narrower portion 58. When lock button 16 is in this position, the door may swing somewhat freely if pushed by a rodent.

When the rodent enters the trap to get the bait 70, he pushes the door 14 in the direction shown by arrow 72. The door, which is light in weight, swings easily open and allow the rodent access to the bait. The tabs 42 pivot within the slots 26 to allow the door to freely open. When the door swings back in the direction shown by arrow 74, or when the rodent pushes on the inside of the door 14 in an attempt to escape, the door rides up ramp 32 and the top of the door slides upward as indicated by arrow 76.

Turning now to FIG. 3, the further progress of the door in the act of closing is shown. The door 14, as it continues to close, rides further up the ramp 32 approaching space 34. The upper portion of the door approaches the bottom of the lock button 16. Thus, the slots 26 should have enough depth to allow the door to completely clear the top of the ramp 32 when the lock button is in the unlocked position shown in FIGS. 2 and 3. In the mouse size version, this depth should allow the door to rise slightly more than the one eighth (⅛) inch height of the ramp 32. However, there should not be enough depth to the slots 26 to permit the door to rise over the block 30.

Turning now to FIG. 4, the trap is shown in the locked position. When the door completely closes, its bottom, which is shown to be tapered to facilitate easy entry into the space, drops into space 34 which retains it firmly and resists any attempts by the captured rodent to escape. The trap being made preferably of a clear plastic, the user can readily detect that a rodent has been captured. When this is discovered, the user simply pushes the lock button downward in the direction of arrow 78 to tightly lock the door into place so the rodent cannot escape. In this locked position, the door may be compressed downward by actual contact with the resilient button, or the button may simply close off the depth of the slot to prevent the door from moving upward enough to clear either the ramp 32 or block 30. The entire device may then be disposed of.

The present invention is clearly much safer than many of the other available rodent traps since it uses no poison and has no blades, spring mechanisms, etc. which could cause injury. This is especially important when the device is to be used around children. Also, the trap has very few parts all of which are easily molded thus manufacturing and tooling costs ar kept at minimum. The device is simple in design and effective.

Of course, those skilled in the art will appreciate that numerous modifications may be made to the basic concept without departing from the present invention. For example, the material choices may be varied as well as the dimensions without departing from the invention. Other modifications, such as use of a ramp and block structure on two sides or other modification of the exact structure may occur to those skilled in the art. Also, the device may be adapted to capture animals of different sizes by varying the disclosed dimensions which are directed to a version suitable for a common mouse. Numerous other variations will occur to those skilled in the art.

THUS, it is apparent that in accordance with the present invention, a method and apparatus that fully satisfies the aims, advantages and objectives is set forth above. While the invention has been described in conjunction with specific embodiments, it is evident that many alterations, variations and modifications will become apparent to those skilled in the art in light of the foregoing description. Accordingly, it is intended that the present invention embrace all such alternatives, modifications and variations as fall within the spirit and broad scope of the appended claims.

What is claimed as new and desired to be secured by Letters Patent of the United States is:

1. An apparatus for capturing rodents, comprising in combination:
   an enclosure having an opening at an end thereof for allowing entry of a rodent;
   a door for closing said opening, said door including an upper and a lower edge;
   hinging means, coupled to an upper portion of said enclosure, for allowing said door to swing from said upper edge thereof;
   ramping means, coupled to said enclosure and situated adjacent said lower edge of said door, for allowing said door to open freely from a set position when urged inward by said rodent, and for causing said door to slide over said ramping means to a latched position when urged outward by said rodent or by the force of swinging to a closed position after having been opened by said rodent.

2. The apparatus of claim 1, further comprising means operable from outside said enclosure for manually locking said door in said closed position.

3. The apparatus of claim 1, wherein said enclosure includes means defining a channel across an upper side thereof, and wherein said upper edge of said door is adjacent said channel.

4. The apparatus of claim 3, wherein said door includes a pair of tabs adjacent said upper edge thereof and wherein said enclosure includes a pair of slots situated near ends of said channel suitable for engaging said tabs to allow said door to pivot at said upper edge and for allowing said door to lift as said door is sliding over said ramping means.

5. An apparatus for capturing rodents, comprising in combination:
an enclosure having an opening at an end thereof for allowing entry of a rodent;
a door for closing said opening;
hinging means, coupled to an upper portion of said enclosure, for allowing said door to swing from an upper edge thereof;
ramping means, coupled to said enclosure, for allowing said door to open freely from a set position when urged inward by said rodent, and for causing said door to move to a latched position when urged outward by said rodent or by the force of swinging to a closed position after having been opened by said rodent; and
wherein said ramping means includes a triangular ramp pointing toward an inner portion of said enclosure which allows said door to slide upward along said ramp when closing.

6. The apparatus of claim 5, further comprising a stop situated adjacent said ramp and defining a space between said ramp and said stop for receiving and captivating said door after said door completely travels up said ramp.

7. The apparatus of claim 5, wherein said triangular ramp is situated adjacent one side of said enclosure.

8. An apparatus for capturing rodents, comprising in combination:
an enclosure having an opening at an end thereof for allowing entry of a rodent;
a door for closing said opening;
hinging means, coupled to an upper portion of said enclosure, for allowing said door to swing from an upper edge thereof;
ramping means, coupled to said enclosure, for allowing said door to open freely from a set position when urged inward by said rodent, and for causing said door to move to a latched position when urged outward by said rodent or by the force of swinging to a closed position after having been opened by said rodent; and
the apparatus further comprising latching means for inhibiting removal of said door when said latching means is in a first position, and for inhibiting opening of said door when said latching means is in a second position.

9. The apparatus of claim 8, wherein said enclosure is made of a substantially transparent material.

10. The apparatus of claim 8, wherein said door is made of a substantially transparent material.

11. The apparatus of claim 8, wherein said enclosure includes means defining an opening adjacent an upper side of said door, and wherein said latching means includes means adapted to fit within said opening and assume either of two positions so that said first position allows said door to move upward by an amount greater than when said means is in said second position.

12. The apparatus of claim 11, wherein said latching means includes means for plugging said opening with a plug having stops which allow said plug to engage said opening at two distinct depths.

13. The apparatus of claim 12, wherein said plugging means is made of a resilient material which may be urged through said opening to said two distinct depths by compression of the material.

14. An apparatus for capturing rodents, comprising in combination:
a transparent enclosure having an entrance at an end thereof for allowing entry of a rodent, and having means defining an opening on an upper surface thereof;
a door for closing said entrance;
hinging means, coupled to an upper portion of said enclosure, for allowing said door to swing from an upper edge thereof;
ramping means, coupled to said enclosure, for allowing said door to open freely from a set position when urged inward by said rodent, and for causing said door to move to a latched position when urged outward by said rodent or by the force of swinging to a closed position after having been opened by said rodent;
latching means for inhibiting removal of said door when said latching means is in a first position, and for inhibiting opening of said door when said latching means is in a second position, wherein said latching means includes means adapted to fit within said opening and assume either of two positions so that said first position allows said door to move upward by an amount greater than when said means is in said second position.

15. The apparatus of claim 14, wherein said latching means includes means for plugging said opening with a plug having stops which allow said plug to engage said opening at two distinct depths.

16. The apparatus of claim 14, wherein said door includes a pair of tabs adjacent an upper edge thereof and wherein said enclosure includes a pair of slots suitable for engaging said tabs to allow said door to pivot at said upper edge.

17. The apparatus of claim 14, wherein said ramping means includes a triangular ramp pointing toward an inner portion of said enclosure which allows said door to slide upward along said ramp when closing.

18. The apparatus of claim 17, further comprising a stop situated adjacent said ramp and defining a space between said ramp and said stop for receiving and captivating said door after said door completely travels up said ramp.

19. The apparatus of claim 17, wherein said triangular ramp is situated adjacent one side of said enclosure.

* * * * *

UNITED STATES PATENT AND TRADEMARK OFFICE
CERTIFICATE OF CORRECTION

PATENT NO.   :   4,782,620

DATED        :   Nov. 8, 1988

INVENTOR(S)  :   Syszczyk et al.

It is certified that error appears in the above-identified patent and that said Letters Patent is hereby corrected as shown below:

On the title page, correct the first inventor's name as follows:

Delete "Antonio M. Syszczyk" and insert--Antonio Syszczyk-- therefor

Signed and Sealed this

Ninth Day of May, 1989

Attest:

DONALD J. QUIGG

Attesting Officer

Commissioner of Patents and Trademarks